Figure 1:
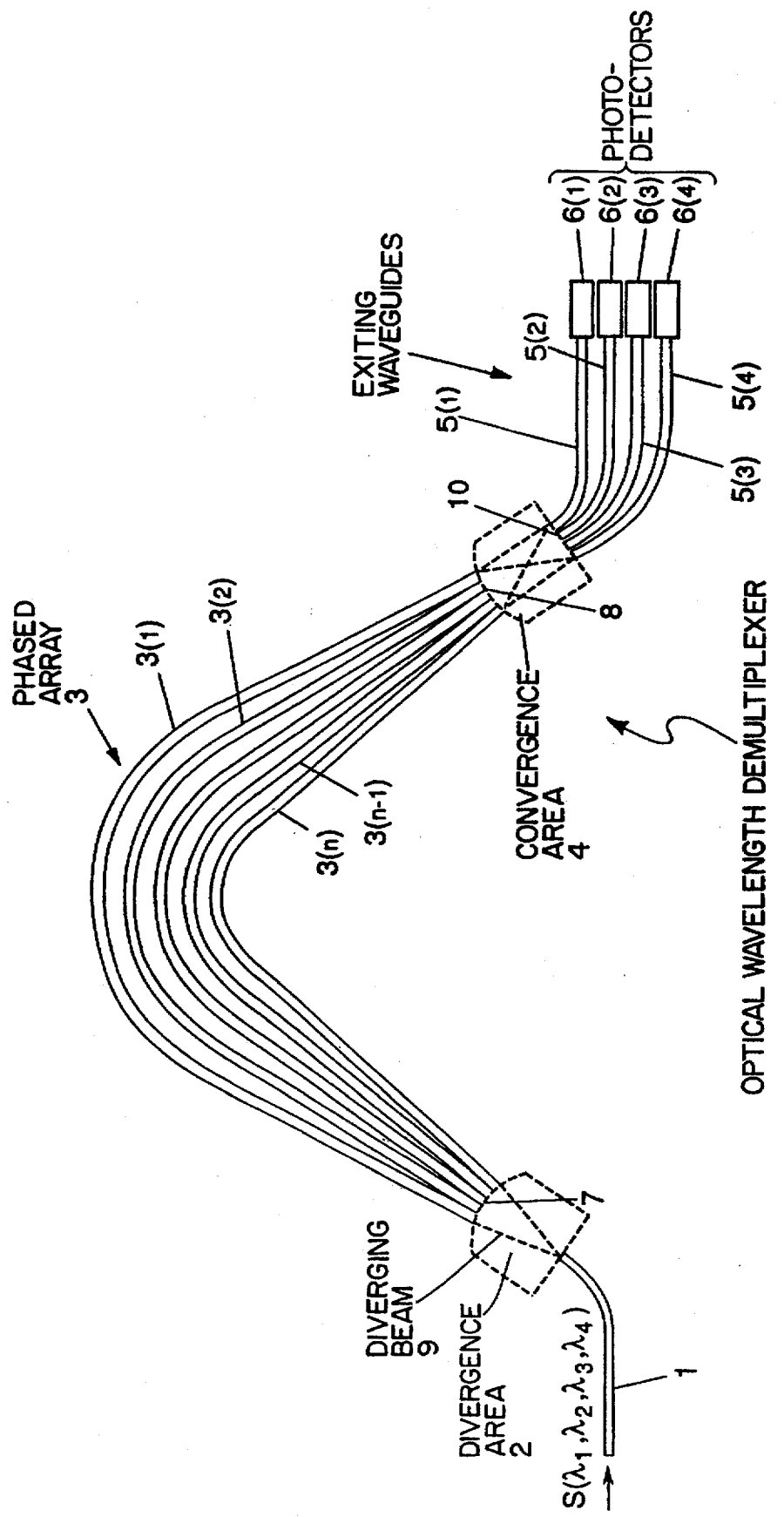

United States Patent [19]

Van Der Tol

[11] Patent Number: 5,680,236

[45] Date of Patent: Oct. 21, 1997

[54] INTEGRATED OPTICAL WAVELENGTH DEMULTIPLEXER

[75] Inventor: Johannes Jacobus Gerardus Maria Van Der Tol, Zoetermeer, Netherlands

[73] Assignee: Koninklijke PTT Nederland N.V., Groningen, Netherlands

[21] Appl. No.: 573,450

[22] Filed: Dec. 15, 1995

[30] Foreign Application Priority Data

Jan. 2, 1995 [NL] Netherlands ............... 9500004

[51] Int. Cl.$^6$ ................................. H04J 14/02
[52] U.S. Cl. ................... 359/127; 359/116; 385/28; 385/39
[58] Field of Search .................. 359/116, 127, 359/130, 115; 385/39, 14, 28, 37, 16, 46

[56] References Cited

U.S. PATENT DOCUMENTS

| | | | |
|---|---|---|---|
| 4,906,064 | 3/1990 | Cheung | 385/16 |
| 4,923,271 | 5/1990 | Henry et al. | 385/37 |
| 5,136,671 | 8/1992 | Dragone | 385/46 |
| 5,243,672 | 9/1993 | Dragone | 385/46 |
| 5,325,221 | 6/1994 | Van der Tol | 359/116 |

FOREIGN PATENT DOCUMENTS

| | | | |
|---|---|---|---|
| 0 285 066 | 10/1988 | European Pat. Off. | H01L 21/306 |
| 0 513 919 A1 | 11/1992 | European Pat. Off. | G02B 6/14 |
| 0 536 819 A1 | 4/1993 | European Pat. Off. | G02B 6/28 |

OTHER PUBLICATIONS

Y. Inoue et al; "Polarization Mode Converter With Polyimide Half Waveplate in Silica-Based Planar Lightwave Circuits"; May 1994; pp. 4-6; IEEE Photonics Technology Letters, No. 5.

A. Vellekoop et al; "Four-Channel Integrated-Optic Wavelength Demultiplexer With Weak Polarization Dependence"; Mar. 1991; pp. 310-314; Journal of Lightwave Technology, vol. 9, No. 3.

M.R. Amersfoort et al; "Low-Loss Phased-Array Based 4-Channel Wavelength Demultiplexer Integrated with Photodetectors"; Jan. 1994; pp. 62-64; IEEE Photonics Technology Letters, vol. 6, No. 1.

S. Suzuki et al; "Polarisation-insensitive Arrayed-Waveguide Grating Multiplexer with SiO2-on-Sio2 Structure"; Apr. 1994; pp. 642-643; Electronics Letters, vol. 30, No. 8.

Y. Shani et al; "Polarization Rotation in Asymmetric Periodic Loaded Rib Waveguides", Applied Physics Letters, vol. 59, No. 11, Sep. 9, 1991, pp. 1278-1280.

H. Heidrich et al; "Passive Mode Converter With a Periodically Tilted INP/GAINASP Rib Waveguide", IEEE Photonics Technology Letters, vol. 4, No. 1, Jan. 1992, pp. 34-36.

H.-G. Unger, "Planar Optical Waveguides and Fibers", Clarendon Press, Oxford 1980, CPT 3 Planar Guides With Transverse Confinement, and More Particularly Sections 3.2, 3.3 and 3.4.

(List continued on next page.)

*Primary Examiner*—Wellington Chin
*Assistant Examiner*—Rafael Bacares
*Attorney, Agent, or Firm*—Frishauf, Holtz, Goodman, Langer & Chick

[57] ABSTRACT

An optical wavelength demultiplexer comprises a monomodal incoming waveguide (1) for an incoming optical signal ($S(\lambda_1, \lambda_2, \lambda_3, \lambda_4)$) being propagated in fundamental guided modes having different polarisations (TE and TM), a conversion device (22) for converting the fundamental modes of one of the polarisations in first-order modes of the other polarisation, a divergence area (23) in which after conversion the incoming signal enters and diverges, a phased array (3) of curved monomodal waveguides provided with an entrance plane (7) and an exit plane (S), for receiving and further guiding the diverging optical signals, a convergence area (32) in which optical signals exiting at the exit plane (8) converge into signal beams ($S(\lambda_i)$) converging into separate wavelength-dependent focuses ($F_i$), and exiting bimodal waveguides (33(i)) joining to said focuses (Fi), thereby providing polarisation independent operation.

3 Claims, 2 Drawing Sheets

OTHER PUBLICATIONS

P.H.L. Notten et al; "Ethcing of III–V Semiconductors, an Electrochemical Approach", Elseviers Advanced Technology, CPT 8: Profile Etching, pp. 237–242.

N. Mabaya et al; "Finite Element Analysis of Optical Waveguides" IEEE Trans. Microwave Theory Tech., vol. MTT-29, No. 6, Jun. 1981, pp. 600–605.

S. M. SZE; "Semiconductor Devices, Physics and Technology" John Wiley & Sons, 1985, CPT. 11: Optical Lithography, Section 11.1.5 Pattern Transfer, pp. 439–442, More Part. FIG. 11.

P.-L. Lui; "Linbo$_3$ Waveguide Modulator With 1.2µ Thick Electrodes Fabricated by Lift-off Technique", IEEE J. Quantum Electronics, vol. QE-18, No. 10, Oct. 1982, pp. 1780–1782.

U. Niggebrugge and G. Garus; "A Novel Process for Reactive Ion Etching on INP, Using $CH_4/H_2$", Inst. Phys. Conf. Ser. No. 79: Chapter 6, Gallium Arsenide and Related Compounds 1985, pp. 367–372.

INTEGRATED OPTICAL WAVELENGTH DEMULTIPLEXER

A. BACKGROUND OF THE INVENTION

1. Field of the Invention

The invention lies in the range of the integrated optical devices. More in particular, it relates to a wavelength demultiplexer for signals of wavelengths in the optical band based on an assembly of several curved optical waveguides, which assembly is known by the name of "optical phased array".

2. Prior Art

There are two types of optical wavelength demultiplexers. A first type is sometimes used to separate signals from several optical windows. Thus, reference [1] (for more details on the references, see below under C.) discloses a demultiplexer which is applied primarily to separate optical signals from the two infrared windows, namely, at 1300 nm and at 1550 nm. The other type of optical wavelength demultiplexer is constituted by the so-called "high-density" demultiplexers, which are applied to separate, within one and the same window, signals of various wavelengths (typical are wavelength differentials as small as 2 nm), as a result of which the transmission capacity may be increased. Of this second type, a demultiplexer based on an optical-phased array is disclosed, e.g., in references [2] and [3]. An optical-phased array comprises a number of curved, channel-type waveguides of different lengths ordered in an array, which waveguides guide optical signals from a beam of light entering an entrance plane to an exit plane. (Note: a monomodal waveguide is understood to mean a waveguide in which one or either of the polarisations (TE and TM) can only propagate in their fundamental propagation mode.) In this connection, the signals exiting from the exit plane reproduce the field profile of the incoming beam of light. This means that, if a diverging beam of light enters the entrance plane of the phased array, from the exit plane there exits a beam converging upon a focus. In the context of the present application, this property of the phased array is referred to as the reproduction property. It is based on the fact that, in the waveguides of the phased array, only fundamental modes propagate. Due to the different lengths of the monomodal waveguides in the array, however, the phase of the contribution from each guide is slightly different, as a result of which a tilt of the phase front occurs. This causes a shift of the focus. The extent of such shift, however, depends on the wavelength of the light. If the light of the diverging beam is composed of different wavelengths, the converging beam of light is focused in a corresponding number of different focuses. By now having a channel-shaped waveguide begin in one or more focuses corresponding to a certain wavelength, one or more light signals of said wavelengths may be split off from the remainder of the converging beam of light. The demultiplexers disclosed in references [2] and [3] are based on this principle. However, the said shift of the focuses in the converging beam of light does not only depend on the wavelengths of the light, but also on the polarisation. Thus, TE-polarised light of a certain wavelength will end up at the entrance of another waveguide than TM-polarised light of the same wavelength. The mutual shift of the focuses occurring here corresponds to the one occurring in the event of a wavelength differential of approx. 5 nm, so that said disclosed demultiplexers generally operate correctly only for purely polarised (TE or TM) light. Only under certain conditions, e.g., as investigated in reference [2], in which a periodicity determined by the array is applied to the phase transfer of the demultiplexer, a demultiplexer may operate polarisation-independently for a certain wavelength. Such additional requirements imposed on the design of a demultiplexer complicate the device, while only a limited polarisation-independence is obtained.

B. SUMMARY OF THE INVENTION

The invention envisages providing a wavelength demultiplexer based on a phased array of optical waveguides which is polarisation-independent. For this purpose, an integrated optical wavelength demultiplexer in accordance with the preamble of claim 1, has according to the invention the characteristic of claim 1. It is based on the insight that the reproduction property of the phased array also implies that, if the diverging beam is constituted by a light signal which originates from a channel-shaped waveguide at an entrance side, in which the light signal propagate in a certain guided mode, said guided mode is also reproduced at an exit side and may propagate further in a channel-shaped guide beginning in the focal plane and matching said guided mode. This not only applies to a fundamental mode (i.e., having ordinal number 0), but also to higher-order modes (i.e., having order numbers 1 and over). Since for a given phased array the location of a specific focus is determined only by the wavelength and the polarisation of a light signal, incoming light signals, which differ only in ordinal number, have the same focus at the exit side. A multimodal waveguide beginning in a focus may receive the signals focused in said focus and guide them on, e.g., to a photo sensor. The invention makes use of this by at the entrance side applying an, at least within the wavelength window applied, wavelength-independent mode conversion to the signal of random polarisation composed of signal components of different wavelengths, before allowing the composite signal to diverge. The mode conversion is such that a converted signal is formed, which comprises only guided modes of one and the same polarisation, but having different ordinal numbers.

Preferably, the demultiplexer of the invention is characterised by claim 2.

By applying mode converters as disclosed in reference [4] or reference [5], the demultiplexer of the invention may be manufactured using standard manufacturing methods for waveguides. In addition, the demultiplexer may be realised with any accepted type of waveguide, and based on any conventional material from the integrated optics. For the purpose of achieving the polarisation-independence, no combination with "bulk" elements is required.

C. REFERENCES

[1] EP-A-0536819;

[2] A. R. Vellekoop and M. K. Smit, "Four-channel Integrated-optic Wavelength Demultiplexer with Weak Polarization Dependence", Journal of Lightwave Technology, Vol. 9, No. 3, pp. 310–314, 1991;

[3] M. R. Amersfoort et al., "Low-loss Phased-array Based 4-channel Wavelength Demultiplexer Integrated with Photodetectors", IEEE Photonics Technology Letters, Vol. 6, No. 1, pp. 62–64, 1994;

[4] EP-A-0513919;

[5] Dutch patent application (of the applicant) No. 9301656, submitted on 24th Sep., 1993.

All references are considered as being incorporated into the present application.

D. BRIEF DESCRIPTION OF THE DRAWING

Figure 2:
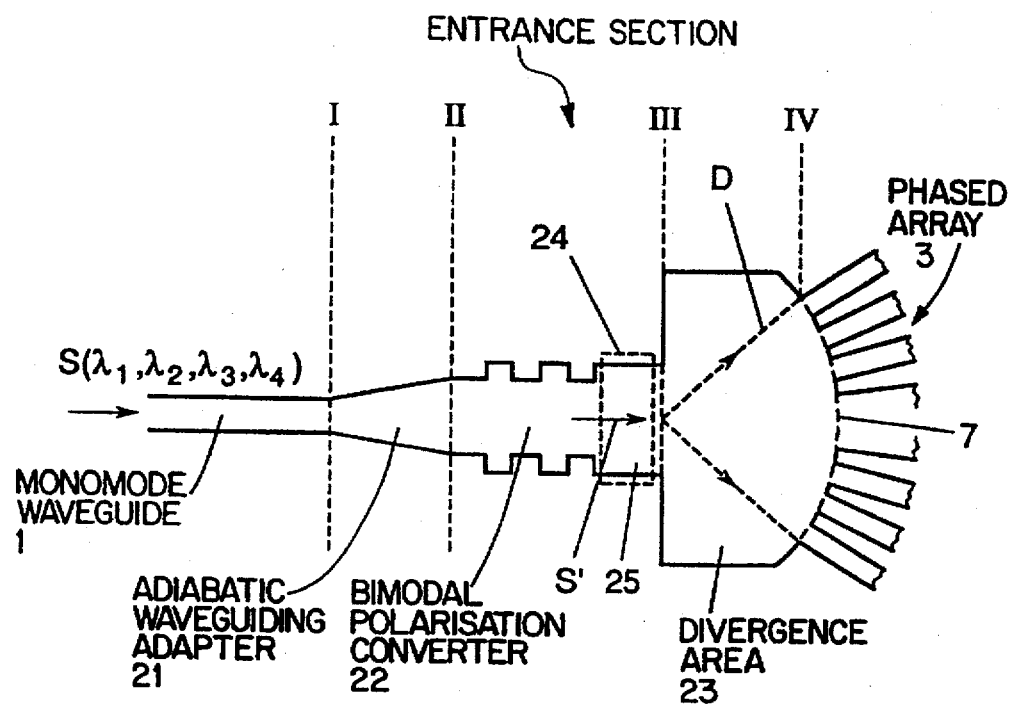
Figure 3:
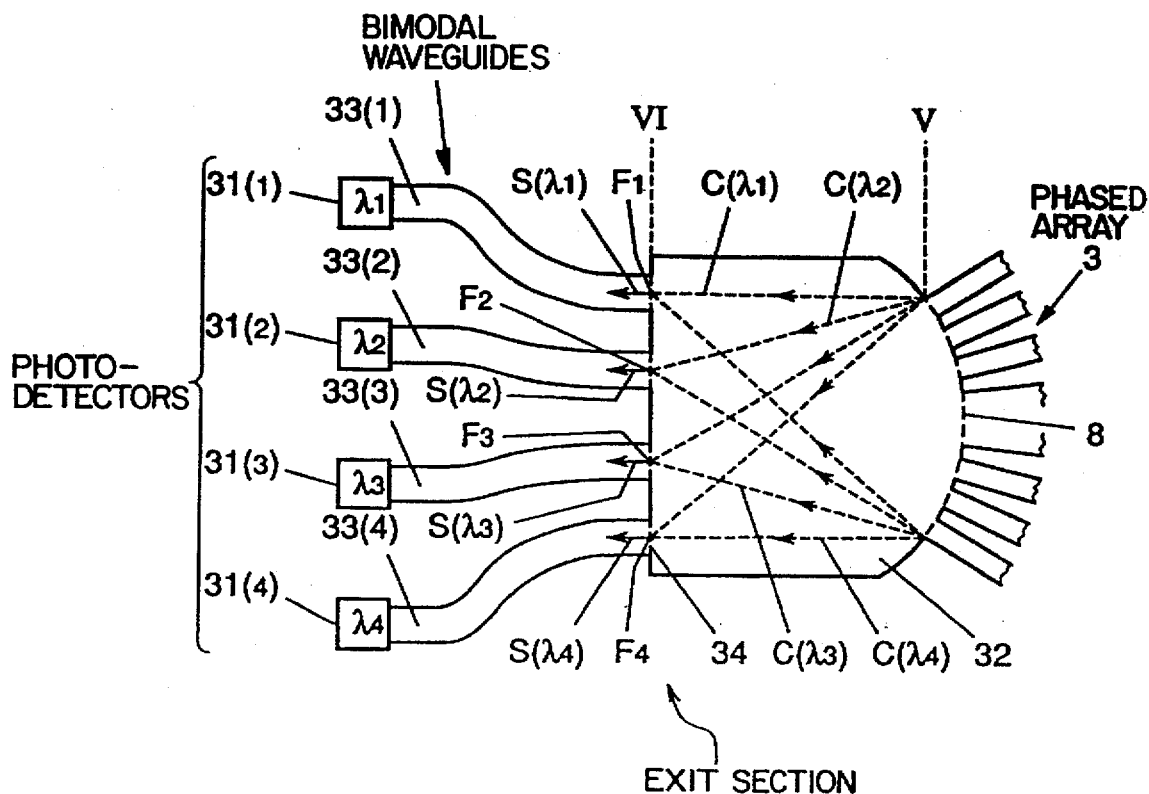

The invention will be further illustrated by means of a description of an exemplary embodiment, with reference to a drawing comprising the following figures:

FIG. 1 schematically shows, in a plan view, a demultiplexer based on a state-of-the-art optical-phased array of channel-shaped waveguides;

FIG. 2 schematically shows, in a plan view, an optical waveguiding entrance section for a demultiplexer in accordance with the invention;

FIG. 3 schematically shows, in a plan view, an optical exit section for the demultiplexer of the invention.

E. DESCRIPTION OF AN EXEMPLARY EMBODIMENT

In reference [3], an integrated optical wavelength demultiplexer for signals of four different wavelengths ($\lambda_1, \lambda_2, \lambda_3, \lambda_4$) is disclosed, based on a phased array of channel-shaped waveguides. FIG. 1 schematically shows a plan view thereof. Such a demultiplexer subsequently consists of an incoming channel-shaped waveguide 1, a divergence area 2, a phased array 3 of n curved channel-shaped waveguides 3(1), . . . , 3(n), a convergence area 4, and four exiting channel-shaped waveguides 5(1) to 5(4). To each of the exiting waveguides 5(i) (for i=1, . . . , 4), there is connected a photodetector 6(i). The phased array 3 is provided with an entrance plane 7 and with an exit plane 8. All incoming and exiting channel-shaped waveguides are monomodal, i.e., they guide only fundamental modes of either orthogonal polarisation TE and TM for optical signals of the said wavelengths. The curved channel-shaped waveguides, too, are such that they guide only fundamental modes. The divergence area and the convergence area are constituted by planar waveguides. A composite light signal $S(\lambda_1, \lambda_2, \lambda_3, \lambda_4)$ coming in via the channel-shaped waveguide 1 is converted, in the divergence area 2, into a diverging beam 9. At least a large part of the light signals of the diverging beam 9 enters the phased array 3 via the entrance plane 7, is further propagated in it in the direction of the exit plane 8, and at the exit plane 8 enters the convergence area 4. The operation of the phased array 3 is such that a field profile, which the diverging beam 9 possesses in the entrance plane 7, is reproduced at the exit plane 8, as a result of which the exiting light signals form a converging beam. This property is called reproduction property. Due to optical path-length differences present in the different guides of the phased array, the exiting light signals exhibit mutual phase differences, as a result of which phase fronts corresponding to the signals undergo a tilt with respect to one another. The extent of said tilt, however, is wavelength-dependent, so that the converging beam for each wavelength is focused in a different focus. Said focuses form a focal plane, indicated by 10 in FIG. 1. By having each of the exiting waveguides 5(1), . . . , 5(4) connected to the convergence area 4 in a different focus of the focal plane 10, each 5(i) of said exiting waveguides captures light signals of a different wavelength, and guides said light signals in the direction of the photodetector 6(i) (with i=1,2,3 or 4) connected to said exiting waveguide 5(i). Said disclosed demultiplexer was designed for a four-channel receiver having a wavelength separation of 2 nm in the 1500 nm window. Since the extent of the tilt of the phase fronts is also polarisation-dependent, said multiplexer shows a polarisation-dependent behaviour as well. Expressed in terms of wavelength differences, said dependence corresponds to a wavelength difference of approximately 5 nm between TM- and TE-polarised light. This means either that the TE-polarised light of a certain wavelength is captured by another exiting waveguide than the TM-polarised light, or that the light of neither of the polarisations is captured. In the former case, this may mean that the wavelength separation is disrupted; in the latter case, this may mean that, in the absence of one of the polarisations, light of a certain wavelength is not detected.

Said polarisation-dependence is eliminated in the demultiplexer of the invention. Here, a passive mode converter is applied, preferably of a type as disclosed in references [4] and [5]. The adopted mode converter is a mode converter which converts a zero-order guided mode (indicated by $TE_{00}$ or $TM_{00}$) into a first-order guided mode ($TM_{01}$ or $TE_{01}$) of a light signal of a certain wavelength $\lambda$ and a different polarisation. Said specific mode converter is henceforward indicated by $TX_{00} \rightarrow TY_{01}(\lambda)$, where $TX \neq TY$, and TX and TY each represent either one of the polarisations TE and TM. Said mode converter is henceforward also called a bimodal polarisation converter.

Passive mode converters of said disclosed type are selective for a certain pair of guided modes, however at a same wavelength $\lambda$ of the light. The converting operation is based on a positive interference of converted fractions in a waveguide having a periodic structure. For a given conversion fraction per period, not only the extent of conversion from the one guided mode into the other of the pair of guided modes, but also the wavelength selectivity, is closely related to the number of periods in the periodic structure of the waveguide. This means that the wavelength selectivity can be expressed in a wavelength band which, with an increasing number of periods, becomes ever more narrow. Particularly for a high conversion fraction, said wavelength band proves to be sufficiently wide, however, to convert all wavelengths within a wavelength band which is conventional for a high-density wavelength demultiplexer. Thus, bimodal polarisation converters are feasible which, in the event of 10 periods, realise a conversion fraction in excess of 97% for all wavelengths within a wavelength band of 25 nm, while a wavelength band which is customary for the HD demultiplexer, is at most 16 nm wide. In the indication $TX_{00} \rightarrow TY_{01}(\lambda)$ of the bimodal polarisation converter, therefore, $\lambda$ is a central wavelength of the wavelength band within which guided modes can be converted.

FIG. 2 schematically shows an entrance section of a demultiplexer in accordance with the invention in a plan view. Said entrance section subsequently comprises, between the incoming channel-shaped, monomodal waveguide 1 for the incoming light signal $S(\lambda_1, \lambda_2, \lambda_3, \lambda_4)$ and the entrance plane 7 of the phased array 3: an adiabatic waveguiding adapter 21, which transfers from a monomodal to a bimodal channel-shaped waveguide; a bimodal polarisation converter 22 based on a bimodal channel-shaped waveguide; and a planar waveguiding connecting piece 23 between the bimodal waveguide of the polarisation converter 22 and the entrance plane 7 of the phased array 3. In the figure, there are indicated transition planes I, II, III and IV, respectively, between the incoming waveguide I and the adapter 21, between the adapter 21 and the bimodal converter 22, between the bimodal converter 22 and the planar connection piece 23, and between the planar connection piece 23 and the phased array 3. Here, the transition plane IV coincides with the entrance plane 7 of the phased array 3. The planar connection piece 23 operates as divergence area for light signals entering the planar connection piece 23 at the transition plane III.

FIG. 3 schematically shows an exit section of the demultiplexer of the invention in a plan view. Said exit section comprises, between the exit plane 8 of the phased array 3 and photodetectors {31(i), with i=1, . . . , 4} and joining to one another: a planar waveguiding connection piece 32, and four bimodal channel-shaped waveguides {33(i), i=1, . . . , 4}. In the figure, there are indicated transition planes V and VI, respectively, between the phased array 3 and the planar connection piece 32, and between the planar connection piece 32 and the four bimodal waveguides {33(i)}. The transition plane V coincides with the exit plane 8. The planar connection piece 32, which joins to the exit plane 8 of the phased array 3, operates as a convergence area having a focal plane 34, which coincides with the transition plane VI. Each bimodal waveguide 33(i) begins in a focus $F_i$ in the focal plane 34, and guides to a photodetector 31(i) connected to the guide 33(i).

A demultiplexer based on a phased array of optical channel-shaped waveguides provided with an entrance section as illustrated in FIG. 2 and an exit section as illustrated in FIG. 3, operates as follows. An entrance signal $S(\lambda_1, \lambda_2, \lambda_3, \lambda_4)$ having an unknown polarisation is propagated in the incoming waveguide 1, partially in accordance with the guided mode $TE_{00}$ and partially in accordance with the guided mode $TM_{00}$, and in said guided modes reaches the bimodal polarisation converter 22 via the adapter 21. If the bimodal polarisation converter 22 is a $TM_{00} \rightarrow TE_{01}$ converter having a bandwidth comprising the four wavelengths $(\lambda_1, \lambda_2, \lambda_3, \lambda_4)$, the incoming signal S is converted by the polarisation converter into a signal S', which for each wavelength within the bandwidth of the converter comprises (at least substantially) exclusively TE modes of both the zero and the first orders. The converted signal S' at the transition plane III enters the connection piece 23 operating as divergence area, and therein forms a diverging lightbeam D. Signals from the diverging lightbeam D at the entrance plane 7 enter the phased array 3, are further propagated through the phased array 3, and subsequently leave it at the exit plane 8. The signals exiting via the exit plane 8 in the planar connection piece 32 operating as convergence area, for each wavelength form converging beams $C(\lambda_1), C(\lambda_2), C(\lambda_3)$ and $C(\lambda_4)$, which converge in separate focuses $F_1, F_2, F_3$ and $F_4$ in the focal plane 34. Each exiting bimodal waveguide 33(i) joins to the planar connection piece 32 in such a manner that it can capture light signals focused in focus $F_i$ and further guide them in the direction of the photodetector 31(i) connected to the bimodal waveguide 33(i) for each (i=1, . . ., 4).

Due to the reproduction property of the phased array, and based on the fact that the tilt of the phase wavefront of the signals entering the convergence area only depends on the wavelength and the polarisation and not on the order of the guided modes in the converted signal S', each converging beam $C(\lambda_i)$ comprises signals exclusively, at least substantially, originating from the guided modes $TE_{00}$ and $TE_{01}$ of the wavelength $\lambda_i$ in the converted signal S'. Signals $S(\lambda_i)$ captured in the focal plane 34 for each bimodal waveguide 33(i) are propagated as $TE_{00}$ and $TE_{01}$ modes. A photodetector does not distinguish between the orders of magnitude of the guided modes of detected light signals. Therefore, each photodetector 31(i) exclusively, at least substantially, detects light signals of the wavelength $\lambda_i$, irrespective of the polarisation state of the light signals having said wavelength in the incoming signal $S(\lambda_1, \lambda_2, \lambda_3, \lambda_4)$.

The exemplary embodiment is described for a demultiplexer for four wavelengths. The principle on which the invention is based, is applicable to greater numbers of wavelengths. A number of 10 different wavelengths is expected to be capable of being realised in practice.

The addition of a bimodal polarisation converter in the entrance section of the demultiplexer based on a phased array, in one dimension will cost approximately 1 mm of additional chip space, so that the entire demultiplexer (for four wavelengths), instead of within approximately 3×2.3 mm², may be realised within an area of approximately 3×3.3 mm².

For the purpose of a purer operation of the demultiplexer, the remainder (e.g., <3%) of the non-converted part of the undesired polarisation in the entrance signal may further onwards in the demultiplexer still be filtered out with the help of polarisation filters. Such a filter may be included in the exit section in each of the exiting channel-shaped waveguides {33(i)}. Preferably, however, a polarisation filter 24 (dotted rectangle in FIG. 2) is included in the entrance section between the bimodal polarisation converter 22 and the planar connection piece 23. If the bimodal polarisation converter is a $TM_{00} \rightarrow TE_{01}$ converter, the polarisation filter must be the TM filter. A TM filter is simple to realise by including a bimodal channel-shaped waveguide 25 between the polarisation converter 22 and the planar connection piece 23, and covering a suitable length thereof with a metal layer.

Finally it is remarked that the invention is also applicable to the case in which more than one incoming waveguides are connected to the divergence area 2 in a manner similar to the incoming waveguide 1 of FIG. 1.

I claim:

1. An integrated optical-wavelength demultiplexer comprising:

an incoming channel-shaped waveguide for guiding incoming optical signals including signal components of different wavelengths, which propagate in first guided modes having mutually differing orthogonal polarisations (TE and TM) and having a mutually identical order, a divergence area into which the incoming optical signals enter and are transformed into diverging signal beams.

a phased array of curved optical channel-shaped waveguides provided with an entrance plane and an exit plane, for receiving and further guiding optical signals from the diverging signal beams in the direction of the exit plane, a convergence area in which optical signals exiting from the exit plane are transformed into signal beams converging towards a number of wavelength-dependent focuses, a number of exiting, optically disconnected, channel-shaped waveguides for further guiding optical signals received in said focuses from the converging signal beams, and conversion means for converting the first guided modes from one of the orthogonal polarisations (TE or TM) into guided modes of the other of the orthogonal polarisations (TM or TE) of an order differing from the first guided modes, wherein said conversion means is included between the incoming waveguide and the divergence area, and wherein said exiting channel-shaped waveguides are arranged for guiding the first and second guided modes of different orders.

2. The demultiplexer of claim 1, wherein said incoming channel-shaped waveguide is monomodal, and wherein said conversion means comprises:

an adapter connected to the incoming channel-shaped waveguide for an adiabatic transition from a monomodal incoming to a bimodal waveguide, and a mode converter, non-selective for the said number of wavelengths, connected to the adapter for converting sero-order guided modes of a first one of two polarisations (TM or TE) into first-order guided nodes el the other of the two polarisations (TE or TM), and wherein said exiting channel-shaped waveguides are bimodal.

3. The demultiplexer of claim 2, further comprising, between the mode converter and the divergence area, a polarisation filter for filtering out guided modes of said first of the two polarisations.

* * * * *

UNITED STATES PATENT AND TRADEMARK OFFICE
CERTIFICATE OF CORRECTION

PATENT NO. : 5,680,236
DATED : October 21, 1997
INVENTOR(S) : Van Der Tol

It is certified that error appears in the above-identified patent and that said Letters Patent is hereby corrected as shown below:

On the Title page, under "OTHER PUBLICATIONS" (column 2):

line 16, before "Planar" insert --"--.

line 17, after "Confinement" insert --"--.

Under Item [57], ABSTRACT, line 10, "(S)" should be --(8)--.

Column 6, line 57 (claim 2, line 9),
"sero-order" should be --zero-order--.

line 58 (claim 2, line 10),
"nodes el" should be --modes of--.

Signed and Sealed this

Twenty-eighth Day of July, 1998

Attest:

BRUCE LEHMAN

*Attesting Officer*   *Commissioner of Patents and Trademarks*